Patented Feb. 20, 1934

1,947,977

UNITED STATES PATENT OFFICE 1,947,977

MANUFACTURE OF ALIPHATIC ANHYDRIDES

Henry Dreyfus, London, England

No Drawing. Application May 25, 1929, Serial No. 366,097, and in Great Britain June 7, 1928

19 Claims. (Cl. 260—123)

This invention relates to the manufacture of aliphatic anhydrides from aliphatic acids and especially to the manufacture of acetic anhydride from acetic acid.

It is known that aliphatic anhydrides can be prepared by subjecting vapours of aliphatic acids to thermal decomposition and various catalysts have been proposed for the reaction.

I have now found that polyhydroxy alcohols and their esters are highly useful catalysts for the reaction.

According to the invention therefore I produce aliphatic anhydrides (and especially acetic anhydride) by subjecting vapours of aliphatic acids (and especially acetic acid) to thermal decomposition in presence of one or more polyhydroxy alcohols or their esters. All such polyhydroxy alcohols and their alkacyl derivatives are hereinafter in the claims included in the term aliphatic polyhydroxy compound containing at least two groups of formula OX where X is hydrogen or an alkacyl residue, said groups being attached to separate carbon atoms. In performing the invention I preferably employ glycerol or mono or poly acetyl derivatives thereof; but any other polyhydroxy alcohols or esters thereof may usefully be employed for the reaction.

The reaction may be performed at temperatures of from about 250° to 1000° C. and preferably at temperatures of from about 300° to 700° C.

The process of the invention may be performed in any convenient manner. For instance, a mixture of acetic or other aliphatic acid and one or more of the polyhydroxy alcohols or esters thereof may be passed in vapour form in a rapid stream through tubes or other form of reaction zone heated to the desired temperature. Such tubes or other form of reaction zone may be made of any suitable material as for instance copper, silica, fireclay, and may if desired be filled with or otherwise contain balls or pieces of pumice, kieselguhr, carborundum or other filling materials. Further, if desired, the tubes or other form of reaction zone may contain catalysts hitherto known to promote the scission of aliphatic acids into their anhydrides.

The mixtures of the aliphatic acid and the polyhydroxy alcohols (or esters thereof) may of course be made by any suitable method, as for instance by simple admixture in the vapour form, or, for instance, by passing the aliphatic acid vapour in a regulated stream through the hot or boiling polyhydroxy alcohols (or esters thereof). In performing the reaction I preferably employ mixtures containing about 1 to 10% of the polyhydroxy alcohol (or esters thereof) though it is to be understood that I in no wise limit myself in this respect.

Instead of first mixing the polyhydroxy alcohol or alcohols (or esters thereof) with the aliphatic acid vapour I may, for instance, inject the said alcohol or alcohols (or esters thereof) in liquid or vapour form, directly into the heated tubes or other form of reaction zone through which the aliphatic acid vapour is caused to pass in a rapid stream.

It is to be understood that the invention is not limited as to the pressure employed, as the process of the invention may be performed under ordinary atmospheric pressure, or under reduced pressure or "vacuum" or under higher pressures than atmospheric, for intsance, under pressures of from 3 to 10 atmospheres or more.

The anhydride produced by the process may be separated from the reaction gases or vapours in any suitable way. The anhydride separated or recovered from the reaction gases or vapours may if desired or required be purified by any suitable means. For instance, it may be distilled from an anhydrous acetate (e. g. anhydrous sodium acetate).

In the recovery or separation of the anhydride from the reaction vapours the reaction gases or vapours are preferably not submitted to simple condensation as such condensation involves hydrolysis and consequent loss of anhydride, but they are preferably treated to separate the anhydride from the water vapour present or formed in the reaction. For instance, the gases or vapours from the reaction zone may be subjected to fractional condensation for example by leading them up through one or more fractionating columns maintained at a temperature or temperatures intermediate between the boiling points (under the conditions of pressure obtaining) of the anhydride and of water, whereby the anhydride is condensed and the water passes on in vapour form.

Or, for instance, the reaction gases or vapours may be passed through one or more solvents for the anhydride which are insoluble in water and which have higher boiling points than water (preferably of higher boiling point than the anhydride), such solvents being employed at temperatures intermediate between the boiling points (under the conditions of pressure obtaining) of water and of the anhydride, whereby the anhydride is condensed or absorbed and the water escapes in vapour form. As examples of such solvents may be mentioned chlorbenzene, paradichlorbenzene, benzylether, tetrachlorethane, paraffin oil, triacetin, phenetol, anisol, one or more cresols, and paracresyl acetate.

Or, for instance, the reaction gases or vapours may be subjected to condensation by the process described in U. S. application S. No. 284,566 filed 11th June 1928, that is to say the anhydride may be condensed from the reaction vapours whilst carrying away the water vapor by the vapour of one or more "entraining liquids". In such form of execution the reaction vapours are preferably mixed after leaving the reaction zone with the vapours of the entraining liquid or liquids at a temperature below the boiling point (under the conditions of pressure obtaining) of the anhydride. Conveniently such mixing may be performed by introducing the reaction vapours (which should not be allowed to cool below the boiling point of water before becoming mixed with the vapours of the entraining liquid or liquids) into a vessel up which the vapours of the entraining liquid or liquids are caused to rise; by this means the anhydride may be substantially condensed and the water vapour carried away with the vapours of the entraining liquid or liquids. Examples of entraining liquids which I may use for such method of condensation are benzene, carbon tetrachloride, petrol, mixtures of two or more of such bodies, or mixtures of ether with petroleum ether; it will be understood however that any other liquids chemically inert to the anhydride and having a high entraining capacity for water may be employed. The liquids should preferably have a low entraining capacity for the anhydride. Entraining liquids such as toluol, xylenes or other "entraining liquids" whose boiling points are intermediate between those of water and of the anhydride are especially suitable for this method of separation.

Or again, for instance, the reaction gases or vapours may be subjected to condensation by the process described in U. S. application S. No. 285613 filed 15th June 1928, that is to say they may be subjected to condensation by leading them under the surface of an "extracting liquid" cooled down or otherwise kept at temperatures below (and preferably considerably below) the boiling point of water. By the term "extracting" liquid is meant a liquid or liquid mixture in which the anhydride is soluble and which is chemically inert to the anhydride and insoluble or substantially insoluble in water. As examples of such "extracting" liquids may be mentioned benzene, chloroform and mixtures of ethyl ether or chloroform with one or more hydrocarbons such as light paraffins, gasoline, kerosene, benzol or its homologues. It is preferable to use as "extracting" liquids, liquids of the character referred to which are themselves hydrocarbons or which contain hydrocarbons, for example, benzene or mixtures of ethyl ether or chloroform with one or more hydrocarbons such as paraffins (particularly the petroleum fraction of boiling point 40° to 70° C. termed petroleum ether), gasoline, (boiling point 70° to 90° C.), kerosene, benzol or its homologues. The following particular examples of "extracting" liquids are very suitable:—ether in admixture with petroleum ether, chloroform mixed with petroleum ether and/or gasoline; and mixtures of ether and petroleum ether containing about 30 to 50% petroleum ether are especially suitable.

Or again, for instance, the reaction vapours may be treated by the process described in U. S. application S. No. 242977 filed 27th December 1927, that is to say they may be passed over or otherwise in contact with one or more "water binding" substances maintained at a temperature or temperatures below (and preferably substantially below) the temperature at which the reaction vapours are produced. By such treatment the water vapour may be substantially absorbed from the reaction vapours. In such treatment the water binding substances are preferably maintained at temperatures above the boiling point (under the conditions of pressure obtaining) of water to avoid condensation of water and resulting risk of loss of anhydride through hydrolysis, and for the best functioning of the treatment the water binding substances should be employed at temperatures above the boiling point of the anhydride in which case the water can be substantially absorbed and the anhydride pass on in vapour form. The term "water binding" substances means bisulphates, pyrosulphates (especially bisulphates and pyrosulphates of the alkali and earth alkali metals), zinc chloride, calcium chloride, orthophosphoric acid, pyrophosphoric acid, metaphosphoric acid and like substances which have affinity (and preferably high affinity) for water but excluding substances having a deleterious effect on aliphatic acids or anhydrides, such as sulphuric acid.

Or again, for instance the reaction vapours may be subjected to condensation by the process described in U. S. application S. No. 330577 filed 5th January 1929, that is to say they may be caused to impinge upon a flowing stream of benzene (or other water insoluble solvent for the anhydride) whereby the gases or vapours are quickly cooled and condensed and the anhydride separated from the water. The benzene (or other solvent) so employed may be collected and the water layer (usually the lower layer) which separates out may be removed and the benzene (or equivalent) layer distilled to recover the anhydride.

In cases where the thermal decomposition of the aliphatic acid vapour is performed under pressures higher than atmospheric it is preferable, prior to subjecting the reaction gases or vapours to treatment for recovery or separation of the anhydride, to pass the reaction gases or vapours through one or more reducing valves or like apparatus in order to reduce the pressure substantially to atmospheric.

It is to be understood that the invention is not limited as to the strength of aliphatic acid employed. The process can be performed even with the vapours of dilute acids; and besides affording a ready means for the manufacture of anhydrides from concentrated or highly concentrated acids, it affords valuable means for producing anhydrides from waste or dilute acids, especially waste or dilute acids such as result from the acetylation of cellulose or other industrial acetylation processes.

The following example serves to illustrate a convenient form of execution of the invention it being understood that it is given only by way of illustration and is in no way limitative.

*Example*

A mixture of the vapors of acetic acid and glycerol, containing between 4% and 7% of glycerol is passed in a rapid stream through a copper or earthenware tube filled with balls or pieces of pumice or carborundum and heated to a temperature between 500° and 600° C. The vapours on leaving the reaction zone are caused to pass upwards through one or more fractionating columns maintained at a temperature or temperatures between the boiling point of the anhydride and of water, whereby the anhydride is substantially condensed from the vapors and the water allowed to pass on in vapour form.

What I claim and desire to secure by Letters Patent is:—

1. Process for the manufacture of an aliphatic anhydride which comprises subjecting the vapor of an aliphatic acid to thermal decomposition in presence of at least one aliphatic polyhydroxy compound containing at least two groups of formula OX, where X is hydrogen or a saturated lower alkacyl residue, said groups being attached to separate carbon atoms.

2. Process for the manufacture of an aliphatic anhydride which comprises subjecting the vapor of an aliphatic acid to thermal decomposition in presence of a saturated lower alkacyl derivative of a polyhydroxy alcohol.

3. Process for the manufacture of an aliphatic anhydride which comprises subjecting the vapor of an aliphatic acid to thermal decomposition in presence of glycerol.

4. Process for the manufacture of an aliphatic anhydride which comprises subjecting the vapor of an aliphatic acid to thermal decomposition in presence of an acetate of glycerol.

5. Process for the manufacture of an aliphatic anhydride which comprises subjecting the vapor of an aliphatic acid to thermal decomposition in presence of a mono-acetate of glycerol.

6. Process for the manufacture of an aliphatic anhydride which comprises subjecting the vapor of an aliphatic acid to thermal decomposition at a temperature between 250° and 1000° C. in presence of at least one aliphatic polyhydroxy compound containing at least two groups of formula OX, where X is hydrogen or a saturated lower alkacyl residue, said groups being attached to separate carbon atoms.

7. Process for the manufacture of an aliphatic anhydride which comprises subjecting the vapor of an aliphatic acid to thermal decomposition at a temperature between 300° and 700° C. in presence of at least one aliphatic polyhydroxy compound containing at least two groups of formula OX, where X is hydrogen or a saturated lower alkacyl residue, said groups being attached to separate carbon atoms.

8. Process for the manufacture of an aliphatic anhydride which comprises subjecting to thermal decomposition a vaporous mixture of an aliphatic acid and a polyhydroxy compound containing at least two groups of formula OX, where X is hydrogen or a saturated lower alkacyl residue, said groups being attached to separate carbon atoms, said vaporous mixture containing between 1% and 10% of the aliphatic polyhydroxy compound.

9. Process for the manufacture of an aliphatic anhydride which comprises subjecting a vaporous mixture of an aliphatic acid and glycerol containing between 4% and 7% of glycerol to thermal decomposition at a temperature between 500° and 600° C.

10. Process for the manufacture of acetic anhydride which comprises subjecting the vapor of acetic acid to thermal decomposition in presence of at least one aliphatic polyhydroxy compound containing at least two groups of formula OX, where X is hydrogen or a saturated lower alkacyl residue, said groups being attached to separate carbon atoms.

11. Process for the manufacture of acetic anhydride which comprises subjecting the vapor of acetic acid to thermal decomposition in presence of a saturated lower alkacyl derivative of a polyhydroxy alcohol.

12. Process for the manufacture of acetic anhydride which comprises subjecting the vapor of acetic acid to thermal decomposition in presence of glycerol.

13. Process for the manufacture of acetic anhydride which comprises subjecting the vapor of acetic acid to thermal decomposition in presence of an acetate of glycerol.

14. Process for the manufacture of acetic anhydride which comprises subjecting the vapor of acetic acid to thermal decomposition in presence of a mono-acetate of glycerol.

15. Process for the manufacture of acetic anhydride which comprises subjecting the vapor of acetic acid to thermal decomposition at a temperature between 250° and 1000° C. in presence of at least one aliphatic polyhydroxy compound containing at least two groups of formula OX, where X is hydrogen or a saturated lower alkacyl residue, said groups being attached to separate carbon atoms.

16. Process for the manufacture of acetic anhydride which comprises subjecting the vapor of acetic acid to thermal decomposition at a temperature between 300° and 700° C. in presence of at least one aliphatic polyhydroxy compound containing at least two groups of formula OX, where X is hydrogen or a saturated lower alkacyl residue, said groups being attached to separate carbon atoms.

17. Process for the manufacture of acetic anhydride which comprises subjecting to thermal decomposition a vaporous mixture of acetic acid and a polyhydroxy compound containing at least two groups of formula OX, where X is hydrogen or a saturated lower alkacyl residue, said groups being attached to separate carbon atoms, said vaporous mixture containing between 1% and 10% of the aliphatic polyhydroxy compound.

18. Process for the manufacture of acetic anhydride which comprises subjecting a vaporous mixture of acetic acid and glycerol containing between 4% and 7% glycerol to thermal decomposition at a temperature between 500° and 600° C.

19. Process according to claim 1 and wherein the reaction vapors are treated to separate the anhydride from the water vapor present in said vapors.

HENRY DREYFUS.